United States Patent

[11] 3,598,341

| [72] | Inventors | Emmett T. La Roe<br>Los Angeles;<br>Jess W. Lockhart, Torrance, both of, Calif. |
|---|---|---|
| [21] | Appl No | 755,030 |
| [22] | Filed | Aug. 26, 1968 |
| [45] | Patented | Aug. 10, 1971 |
| [73] | Assignee | McDonnell Douglas Corporation |

[54] AIRCRAFT STORE CARRIER
7 Claims, 12 Drawing Figs.

[52] U.S. Cl. ..................................... 244/118,
244/137
[51] Int. Cl. ..................................... B64d 1/02
[50] Field of Search ........................................ 244/118,
137

[56] References Cited
UNITED STATES PATENTS
| 2,832,632 | 4/1958 | Johnson | 294/83 (.1 ER) |
| 2,869,426 | 1/1959 | Wilkie | 244/137 |
| 3,037,805 | 6/1962 | Geffner et al. | 244/137 |
| 3,268,188 | 8/1966 | La Roe et al. | 244/118 |

Primary Examiner—Milton Buchler
Assistant Examiner—Steven W. Weinrieb
Attorneys—Walter J. Jason, Donald L. Royer and Ming Y. Moy ABSTRACT: A store carrier supports a store from two store lugs. The store is supported from a substantially central point with one end of each of a pair of hooks being pivotally mounted to a carrying vehicle such as an aircraft, and the other end of each hook being linked to a latch means. A reaction force necessary to activate the hooks is related to a downward force applied thereto by the store. Clamps are provided at each suspension hook to urge each store lug against a portion of the vehicle structure to eliminate sway in the store. A thruster means is positioned adjacent the store to impart downward force to the store when released from the suspension hooks. Propellent means are provided for unlocking the latch of each hook, to activate the suspension hooks and the thruster means.

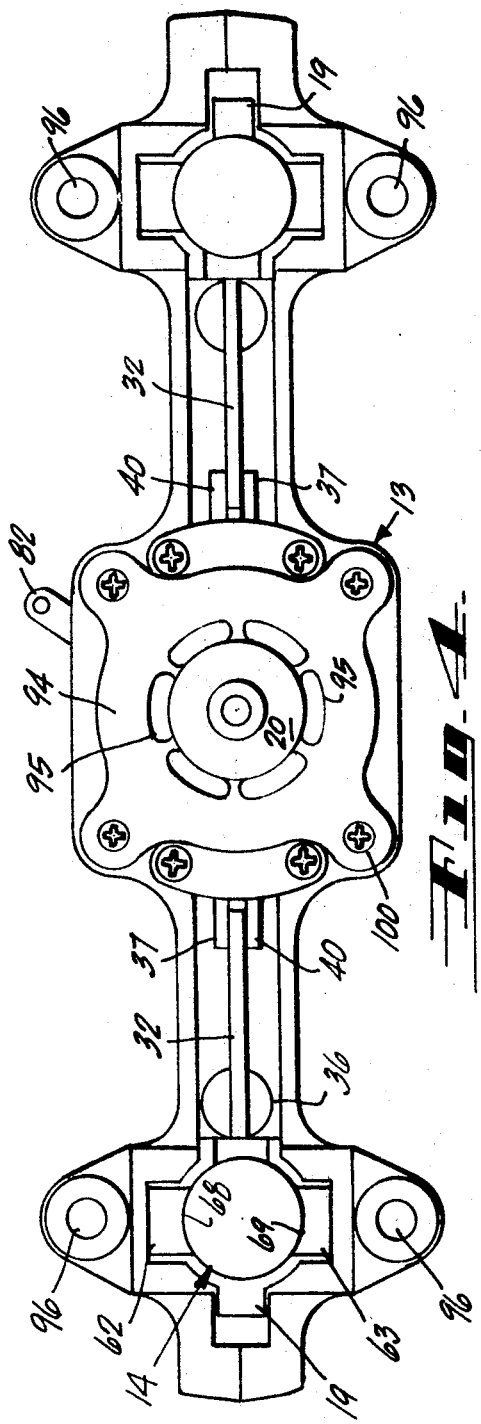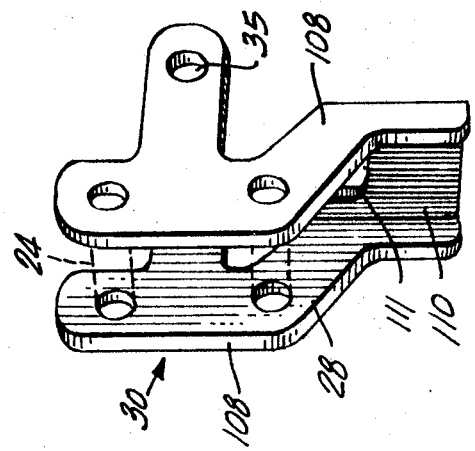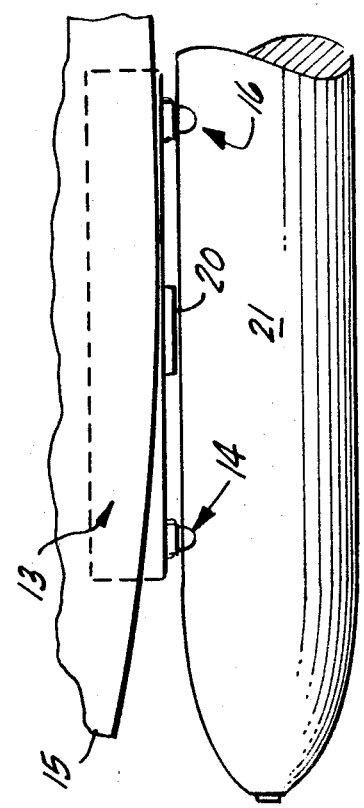

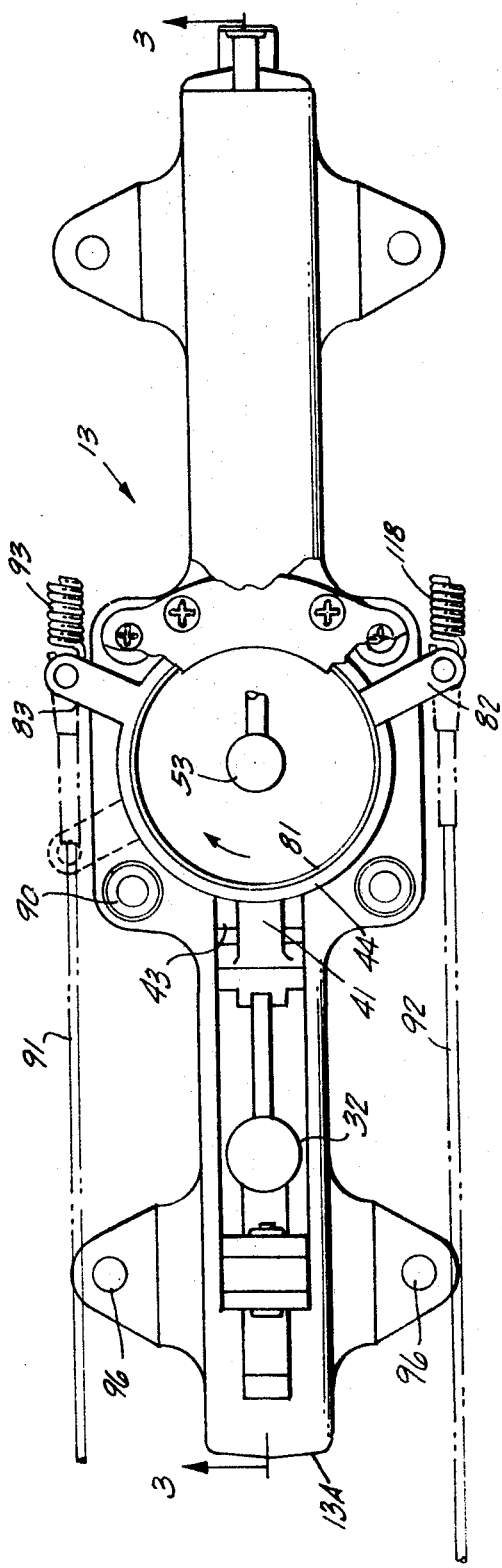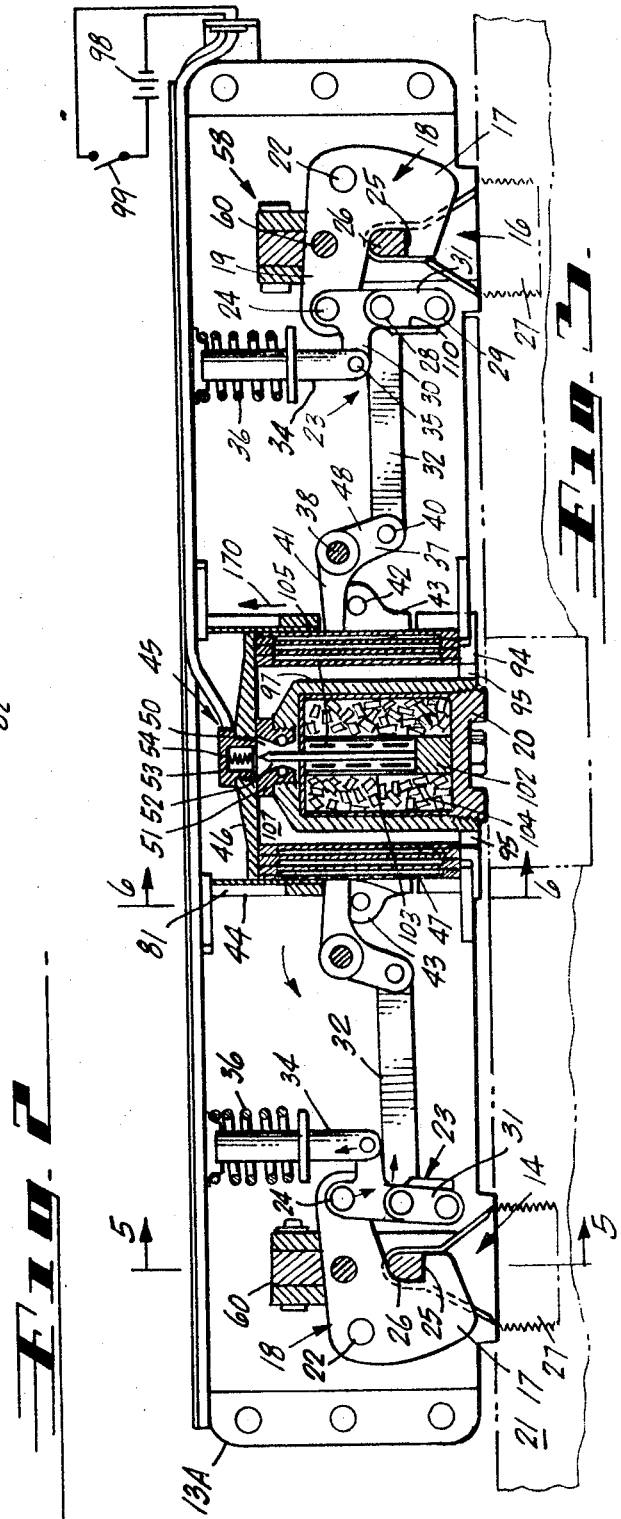

INVENTORS
EMMETT T. LAROE
JESS W. LOCKHART

By Ming Y. Moy
ATTORNEY

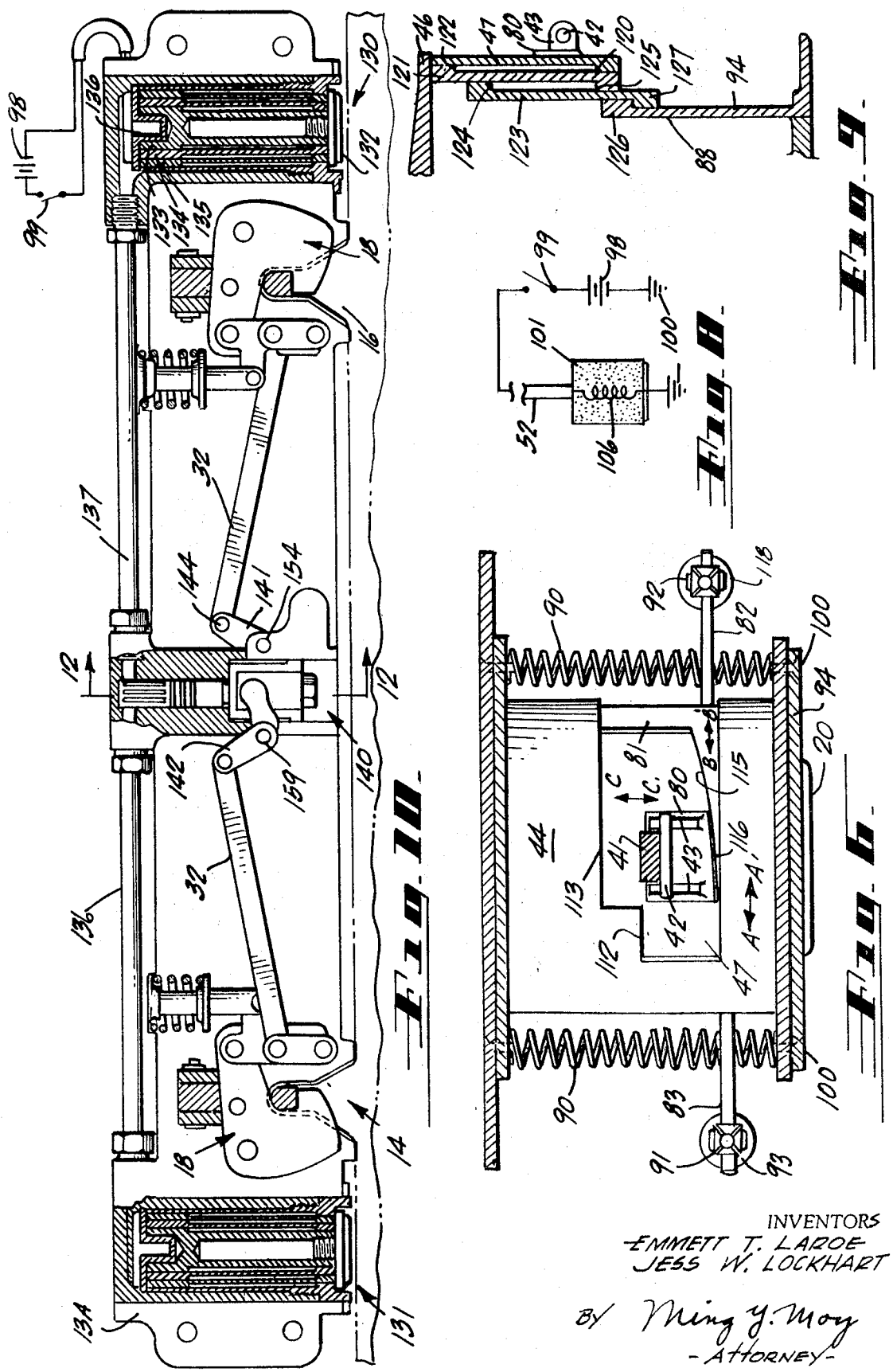

3,598,341

AIRCRAFT STORE CARRIER

BACKGROUND OF THE INVENTION

This invention pertains to useful improvement in an aircraft store carrier and more particularly to a store carrier having a reduced profile height and an integral wedge clamp which minimize sway.

Various types of aircraft bomb racks have been used in the past with antisway devices. Some of these sway devices extend from a store to some part of the aircraft structure. If these sway bars are exposed to airflow, they cause considerable wind resistance and when used on an aircraft, reduce the speed and range of the aircraft. Therefore, it is desirable to employ a sway device which is not exposed to airflow. One such device is disclosed in U.S. Pat. No. 3,268,188 entitled "Store Carrier with Sway Braced Lug" by Emmett T. LaRoe et al. The device of that invention performs satisfactorily but requires that the lugs affixed to a bomb or other store to be carried, be of a T-shaped cross section. In more cases, store lugs are not T-shaped, but are in the configuration of an inverted U. In that patent, wedges are slidable along a top surface of the T-shaped lugs to urge them tightly against the release hooks to take up any play which could possibly allow the store to sway.

Various devices have been used to eject a store from a rack or other store carrier. One device for such ejection is disclosed in U.S. Pat. No. 2,856,224 entitled "Means for Mounting Jettisonable Stores on Aircraft" by Robert B. Kelly et al. In that patent, a cylinder and piston member is located intermediate the two hangers on a bomb and, when activated by fluid pressure created by an explosive charge, the piston exerts an ejection force against the bomb. The cylinder in that particular patent is quite long, which requires that a streamlined fairing be inserted between the store and a wing of the aircraft in order to minimize aerodynamic drag.

The device of the present invention employs a telescoping ejection member which makes for a more compact and aerodynamically perfect arrangement along with the additional feature of providing antisway means contained within the rack and out of the aerodynamic flow. The provision of two points of support for each of the store hooks enables support of only one-half of the total weight present at each hook, thereby similarly reducing the reaction force necessary to pivot each hook about its end point.

Another prior device of interest is disclosed in U.S. Pat. No. 2,822,207 entitled "Release Ejector" by John C. Steinmetz et al. The ejector device of that patent utilizes two telescoping ejectors positioned at bomb retaining hooks and which form a part of a retaining hook such that when the bomb is released, the ejectors push forcibly against the hooks to force the stores away from the aircraft in a firm controlled manner. The device of that patent requires additional external sway braces and the hooks used to support the particular store are each pivoted about a restraining pin which singularly must be capable of supporting the entire weight of the store through each suspension lug of the store. It is a direct improvement upon the state of the art to provide a store carrier having a low cross-sectional profile which requires less force than heretofore used to release the store and to provide a telescoping ejector for ejecting the store from the aircraft, the latter having an integral antisway device for preventing the store from swaying while attached to the carrier.

SUMMARY OF THE INVENTION

In carrying out the principles of this invention according to one embodiment thereof, the store carrier is mounted substantially flush with a surface of a carrying aircraft. Two suspension hooks are employed to support a store from two inverted U-shaped lugs affixed to the store. The lugs engage the suspension hook at substantially the midpoint between the ends of the suspension hook. One end of each of the suspension hooks is pivotally affixed to the carrier while the other end is connected to a mechanical release linkage which allows the hooks to rotate about a pivot point to release the store lugs and which, in the carrying position, supports approximately one-half of the weight which is present at the store lug. A telescoping thruster means activates the mechanical linkage for releasing the store and also exerts a force against the store to eject it from the aircraft. Return springs attached to the thruster bias it into the carrier after extension to reduce aerodynamic drag. A propellent charge activated by an electrical ignitor provides activating power for the thruster means. A wedge means is supported from, and actuated by each of the suspension hooks to wedge the store lugs against the store carrier to prevent the store from swaying.

Accordingly, it is an object of the present invention to provide an improved aircraft store carrier which uses less reaction force than heretofore used to activate suspension hooks.

It is a further object of the invention to provide a store carrier having a low cross section and an integral antisway means.

BRIEF DESCRIPTION OF THE DRAWINGS

FIG. 1 is a fragmentary elevational view of one embodiment of the invention positioned on an aircraft supporting a store;

FIG. 2 is an enlarged, partially fragmentary top plan of one embodiment of the invention;

FIG. 3 is a sectioned view of the store carrier taken along line 3–3, FIG. 2;

FIG. 4 is a bottom pan view of the embodiment of the invention shown in FIG. 2;

FIG. 6 is an enlarged transverse sectioned view taken along line 6–6, FIG. 3;

FIG. 7 is an enlarged perspective view of a portion of the mechanism illustrated in FIG. 3;

FIG. 8 is a schematic diagram of an ignitor which may be used with the invention;

FIG. 9 is an enlarged fragmentary view of another portion of the embodiment of FIG. 3;

FIG. 10 is a longitudinal sectioned view of another embodiment of the invention;

DESCRIPTION OF THE PRESENT EMBODIMENTS

Figure 5:
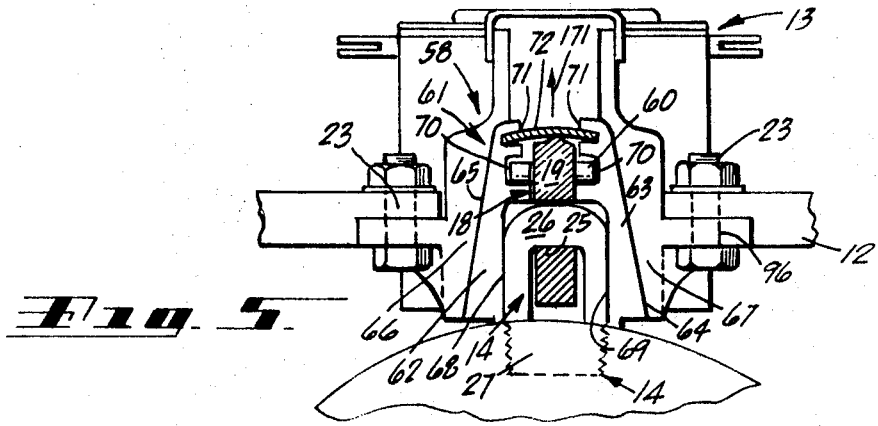
FIG. 5 is a transverse sectioned view taken along line 5–5, FIG. 3.

Referring to FIG. 1, a store carrier 13 is generally secured to a structure 15 of an aircraft. A store 21, having two lugs 14 and 16 is shown suspended from the aircraft by means of the store carrier 13. A thruster plate 20 is shown positioned at approximately the midpoint between lugs 14 and 16 and in contact with the store 21.

As shown primarily in FIGS. 2, 3, 4 and 5, the store carrier 13, which includes a store carrier frame 13A, is mounted to the aircraft structure 15 by means of bolt fasteners 23 which pass through four mounting lugs having openings 96 defined therein. The store lug means 14 and 16 are each identical in construction and consist of a lower cylindrical section 27 which threadably engages a mating opening in the store and an inverted U-section 26 which has a supporting surface 25. The surface 25 is relatively flat to distribute the weight of the store. A pair of suspension hook means 18 are affixed to the store carrier 13 by means of support pin 22.

The suspension hooks 18 are each shaped in the form of a letter "J" which in the mounted position is laying on its side. Each suspension hook has integral long and short arms 19 and 17, respectively. The long arm 19 is supported at one end by the pin 22 and at the other end by a linkage means 23 which includes a T-shaped link 30 and a link 31. A pin 24 connects the link 30 to the arm 19. A pin 28 connects links 30 and 31 to a release rod 32. Link 31 is supported at its other end by a pin 29 which is fixedly attached to the store carrier 13. The short arm 17 extends toward the pin 24 from the pin 22 and has a recessed supporting surface 25 for receiving the U-shaped section 26 of lugs 14 and 16. The supporting surface 25 is positioned substantially midposition between pins 24 and 22 to effectively divide the weight felt on lugs 14 and 16 equally between pins 22 and 24. The reaction force required at the pin 28 to pivot the suspension hooks about the pivot point 22 will be much less than would be required if the entire weight of the store was supported by the pin 22 alone.

Attached to one of the arms of the T-link 30 is a spring 36, the force of which is transmitted to the link through an extension rod 34 which is pivotally connected to the link 30 by means of a connecting pin 35. The spring 36 exerts a force directed toward the pin 35. In the locked position, links 30 and 31 are essentially one rigid member which supports one-half of the stores weight through pins 24, 28 and 29. The release rod 32 is connected to an L-shaped bellcrank 37 by means of a pivot pin 40. The bellcrank rests against an actuating pin 42 connected to the thruster means or activating means 45 by means of lugs 43.

Referring now to the T-shaped link member 30 as shown in FIG. 7. It is comprised of two similar wall sections 108 which are joined in a spaced-apart position by a flat surface 110. The flat surface is provided with a notch 111 to allow for mechanical clearance of the rod 32. The position of the pivot pins 24, 28 and 35 are shown in dotted positions to illustrate the relative orientation of this T-link with respect to its position in FIG. 3.

As shown in FIG. 3, in combination with FIG. 7, the flat surface 110 is positioned in intimate contact with and urges the link 31 into an upright position. The link 31 is urged, through the T-link 30 and by means of the spring 36, in a direction to dispose the flat surface 110 against the link 31. This, in turn, assures the upper maximum extension of the pin 24 which, in turn, places the suspension hook 18 firmly in the locking position.

To unlock the suspension hook, the bellcrank 37 through an arm 41 is rotated in a clockwise direction, as viewed in FIG. 3, by movement of the support pin 42 in the direction of an arrow 170. As the pin 42 moves in the direction of the arrow 170, the arm 41 also moves in the same direction thereby causing an arm 48 to move in a clockwise direction, as viewed in FIG. 3, pulling the release rod 32 with it. In turn, the pin 28 is pulled to travel in a counterclockwise direction because it is firmly linked to the pin 29 which is fixedly attached to the store carrier 18. As the pin 28 travels in a counterclockwise direction, it pulls the pin 24 which pivots the suspension hook 18 about the pivot support pin 22. Any store that is supported on the surface 25 will disengage at this particular time.

Referring specifically to FIG. 5, in combination with FIGS. 2, 3 and 4, a wedging means 58 is providing at each of the suspension hooks to wedge the lugs of the store firmly in place on the store carrier. The wedging means 58 includes a pair of symmetrical wedges 62 and 63 having inner surfaces 68 and 69 that conform to the shape of the store lug. In this particular application, the lug section 26 on the store is circular in shape; so to achieve maximum friction surface, surfaces 68 and 69 being curved to conform to the outer surface of the lug section 26. The outer surfaces 64 and 65 of wedges 63 and 62, respectively, are shaped to provide the standard wedge configuration and to slide along the surfaces 67 and 66, respectively, of the store carrier structure. A first recessed opening 70 is provided in each of the wedges to receive loosely a restraining pin 60 which passes through the arm 19 of the suspension hook 18. The pin 60 may be positioned conveniently midway between pins 24 and 22. In the assembled position on the store carrier, the pin 60 retains the wedges 62 and 63 in the store carrier. A leaf spring 72 is placed under tension into a second recessed opening 71 in each of the wedged members and butting against the arm 19 to apply a force to each of the wedges in the direction of an arrow 171, thereby decreasing the clearance between the wedge surfaces 68 and 69 and the store lugs 14 and 16.

Referring to the thruster means or activating means 45 for activating the linkage means 23, as shown in FIG. 3, it is comprised in part of an inverted cup which forms a chamber 107 having a cylindrical, thin-wall section 47 capped off at its end by a relatively thick end member or movable wall 46. The lugs 43 are firmly attached to the walls of the cylinder 47. A second thin-wall cylinder 81 surrounds the cylinder 47 and forms a cylinder wall which allows the cylinder 47 to move similar to a piston along the longitudinal axis of the cylinder. The cylinder 81 is free to rotate about its longitudinal axis. A cylinder 44 of relatively thick-wall construction surrounds the cylinder 81 and the cylinder 47. The cylinder 44 is also free to rotate about its longitudinal axis.

Referring now to FIG. 6, the lugs 43 are shown affixed to the cylinder 47 by means of a projecting baseplate 80 which projects slightly from the outer wall of cylinder 47. A surface 116 of the baseplate is curved slightly to form a ramp surface. The cylinder 81 is cut away around the area surrounding the baseplate 80. It also is provided with a ramp surface 115 which is complementary to the surface 116. An arm 82 projects radially from, and is fixedly attached to, the cylindrical member 81 and is connected by means of a mechanical linkage 92 to a manual store release actuator which, for the purpose of convenience, can be located in a cockpit of the aircraft. A return spring 118 returns the arm 82 to the neutral position when it is inactivated. As a pulling force is applied to the arm 82, the cylinder 81 is rotated in a direction B as shown by an action arrow B-B¹. The rotational movement of the cylinder 81 causes the ramp surface 115 to engage surface 116. The lugs 43 are thereby forced to travel along a direction C shown by an action arrow C-C¹, causing the arm 41 of the bellcrank 37 to travel in the direction of the arrow 170 (FIG. 2), by means of the pin 42, to release the store through the suspension hooks without the use of the propellent-type thruster. When the cylinder 81 is rotated in the B¹ direction the bellcrank arm 41 is returned to its normal or inactivated position. The cylinder 44 has a notched surface 113 which provides sufficient clearance for the arm 41 to operate suspension hooks 18. A second lower level retainer 112 is used as a safety device to limit and restrain the arm 41 from movement in the direction of C, shown by the action arrow C-C¹, which would cause operation of the suspension hooks. The cylinder 44 is fixedly connected to an arm 83 which projects radially therefrom to a safety lock actuator 92 which is pivotally connected to the arm 83 and to a return spring 93. The return spring 93 returns the arm 83 to a neutral position when it is not being acted on by the rod 91. When the cylinder 44 is moved in the A¹ direction shown by an action arrow A-A¹, the ledge 112 travels to a position above the bellcrank arm 41 and limits its movement in the direction of A, shown by the action arrow A-A¹. When the cylinder is again rotated in the A direction, the ledge 113 is placed over the actuator arm 41 and the system is ready for release.

Referring back to FIGS. 2, 3 and 4, in combination now with FIG. 6, the thruster propellent case 97, the bottom surface of which is normally in contact with the store 21, is connected to a piston member 94. The thruster propellent case 97 houses a thruster propellent means 104 and a propellent ignitor 102 along with a powder-trapped filter 103. An electrical contact rod 52 extends axially from the propellent ignitor 102 to a metal spring contact 54 which, in turn, is connected to a battery or other power source 98 by means of a firing switch 99. A venturi shape opening 50 is provided in the propellent case 97 to control the direction and flow of gaseous combustion products. The powder-trapped filter 103 is provided with openings 105 which are positioned in a controlled manner to allow for even gas expansion. The thruster piston 94 is provided with a thruster vent port 95 to provide an escape path for the propellent gases.

A detail view of the propellent ignitor 102 is shown in FIG. 8. A block of black powder 101 has a heating element 106 embedded therein. The heating element 106 is connected at one terminal to a ground 100 and its other end to the conducting rod 52 which, in turn, is connected to the switch 99 and the power source 98. The source 98 is connected to the ground 100 to complete the circuit when the switch 99 is closed.

In operation, the gaseous combustion products pass through the openings 105 in the powder-trapped filter 103, through the venturi-type opening 50 to exert pressure against the movable wall or cylinder end 46 and the piston element 94. The ejector means 88, which includes the piston element 94 and the propellent case 97 connected thereto, is forced to travel in a direction away from, but perpendicular to, the end member 46. The end member 46 along with the cylinder 47 is simultaneously forced to travel in the direction of the action arrow 170, thereby actuating the linkage means 23. The gaseous combustion products are deflected from the end member 46 into the chamber 107 and from which, the gaseous combustion products are vented through the thrust vent ports 95. In the process of moving in the direction away from, but perpendicular to, the end member 46, the piston member 94 causes cylinders 123 and 121 to travel in the same direction, as shown in FIG. 9.

The operation of the ejector means 88 is shown in FIG. 9. The telescoping piston 94 is shown partially extended with a ring-type lip portion 126 at the uppermost portion of the cylinder contacting a mating-type ring portion 127 which is affixed to the bottom of the slightly larger diameter cylinder 123. Attached to the uppermost portion of the cylinder 123 is a projecting ring lip portion 124 which mates in its lowermost position with a similar ring lip portion 125, which projects inwardly from the slightly larger diameter cylinder 121. A ring-type lip portion 122 projects outwardly from the cylinder 121 and is adapted to butt against an inner ring lip portion 120 which is affixed to the inner side of the cylinder 47. As the piston 94 progresses in its travels, each one of the ring sections comes into contact with its mating surface to extend the total length of travel of the piston 94. When the energy from the gaseous combustion is expended, springs 90, which are attached to the piston 94, as shown in FIG. 6, return each of the cylinders to the retracted position.

A second embodiment of the invention is shown in FIG. 10. The suspension hook and linkage arrangement in the embodiment illustrated in FIG. 10 is identical to the preceding embodiment and the discussion pertaining thereto is equally applicable to this embodiment and will not be repeated for brevity sake. In some applications it is desirable to employ a telescoping thruster positioned in close proximity to each one of the support lugs of the store so that upon expansion of the thruster, an equal force pushes the store away at each end without causing a canting or twisting motion of the store. To accomplish this while still utilizing the novel suspension hooks of the present invention, two smaller thrusters or ejector means 130 and 131 are positioned adjacent to each one of the suspension hooks, the thrusters are identical in configuration and operation. Pressurized gas enters a pipe 137 and through an orifice 136 to exert a force against a piston 133 having a hardened contact surface 132 abutting against the outer surface of the store. The piston 133, in turn, moves in the direction of the store bringing a second cylindrical section 134 with it when it reaches the lip portions that are identical to the preceding description. The cylinder portion 134, in turn, brings down a cylinder 135 to provide a telescope arrangement which was shown in the preceding embodiment.

Figure 11:
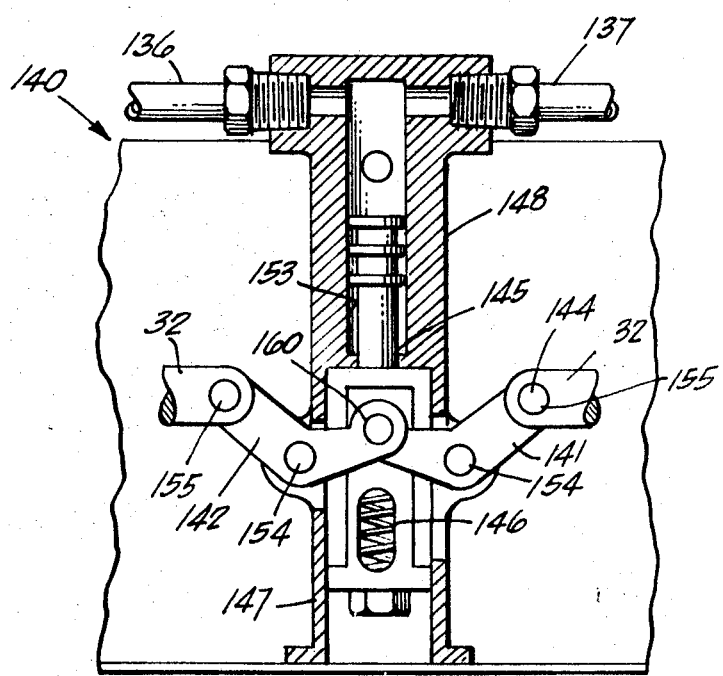
FIG. 11 is an enlarged sectioned view of a portion of the embodiment of FIG. 10.
Figure 12:
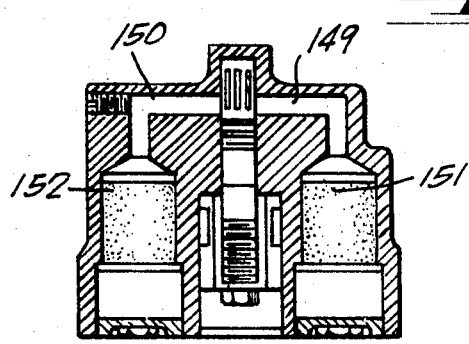
FIG. 12 is a sectioned view taken along line 12–12, FIG. 10.

An actuating means 140 for the suspension hooks 18 is shown in FIGS. 10, 11 and 12. Pressure tubes 149 and 150 receives a pressurized gas from a pair of explosive cartridges 151 and 152, respectfully, or other store gas supply when the store is to be released. The pressure tubes are connected to a chamber fitting 148 which forms a gas chamber. A tie rod activating piston 145 is positioned to receive the expanding gases from the chamber in order to activate the piston. The piston 145 is slidably mounted in a cylinder 153. Cranks 142 and 141 are pivotally mounted to the shaft of the piston 145 by a pivot pin 160. Each of the L-shaped bellcranks 141 and 142 is pivoted from a centrally located pivot pin 154 which, in turn, is affixed to the outer cylindrical housing 147. The other ends of the cranks 141 and 142 are connected to the reaction rods 32 by means of pivot pins 155. In operation, when piston 145 moves toward the store under the influence of the pressurized gases in the chamber 148, the cranks 142 and 142 rotate, pulling reaction rods 32 toward the support cylinder 147. The movement of the reaction rods rotate the hooks 18 to release the store 21. A return spring 146 is inserted in the piston 145 in the manner shown to enable the return of the piston to its normal position after activation. Pressurized gas for operating the thruster-telescopic ejector means 130 and 131 is conducted from the chamber 148, via tubes 137, to the orifices 136. The suspension hooks 18 operate just prior to movement of the thruster-telescopic ejector assembly 130 and 131 because more time is required for a buildup of the required pressure at the orifices 136 than is required at the chamber 148. Similar wedge means are used to restrain the store lugs 14 and 16 from sway motion as described in the preceding embodiment.

We claim:

1. A store carrier for mounting a jettisonable store on an aircraft and for releasing the store with ejective force, the store having at least two inverted U-shaped lugs connected thereto, comprising:
   a store carrier frame;
   suspension hooks adapted for engagement with said inverted U-shaped lugs, each of said suspension hooks including a long arm, a short arm, a central body portion and opposite side faces, said inverted U-shaped lugs being supported in a vertical direction on said short arms;
   wedge means disposed adjacent the opposite side faces of said hooks and acting generally horizontally to restrain swaying movements of the inverted U-shaped lugs of the store;
   means for pivotally mounting said central body portion to said store carrier frame;
   linkage means mounted to said store carrier frame for supporting the long arm of said suspension hooks, such that approximately one-half of the weight on said short arm is supported by said linkage means and the other half is supported by said pivotal mounting means; and
   activating means operatively coupled to said linkage means activating said linkage means to cause said suspension hooks to pivot with respect to said carrier to release the lugs.

2. The invention according to claim 1 wherein said suspension hooks include projections which extend out from the opposite side faces thereof and said wedge means include indented portions whereby said projections extend into said indented portions of wedge means to restrict the vertical movement of said wedge means.

3. The invention according to claim 1 wherein each of said suspension hooks includes a projection which extends upwardly therefrom and said wedge means include pairs of wedge members disposed adjacent the opposite side faces of said hooks, each pair of wedge members including a spring member therebetween, said spring members cooperating with said projections of said hooks to raise said wedge members into lug engagement positions as said hooks engage the inverted U-shaped lugs of the store.

4. The invention according to claim 3 wherein said wedge members include engagement faces for engagement with the inverted U-shaped lugs of the store, each engagement face being contoured to contact a substantial portion of the side of the adjacent inverted U-shaped lug.

5. An aircraft store carrier for mounting a store jettisonable in a predetermined direction having a predetermined number of inverted U-shaped lugs connected thereto comprising:
   a frame;
   hooks for engagement with the inverted U-shaped lugs of the store, said hooks each including a lower arm portion, a central body portion, an upper arm portion generally parallel to said lower arm, and first and second side portions, each hook being pivotally mounted at the body portion thereof to said frame for rotation in a plane parallel to said first side portion for engagement and disengagement with an inverted U-shaped lug;

wedge means disposed adjacent said first and second side portions of each hook for acting generally at right angles to the predetermined jettison direction against the inverted U-shaped lugs engaged by said hooks to restrain swaying movements of the inverted U-shaped lugs and the store connected thereto;

linkage means connected to the upper arm portions of said hooks; and activating means operatively coupled to said linkage means for activating said linkage means to cause pivotal movement of said hooks to disengage the inverted U-shaped lugs.

6. The store carrier defined in claim 5 wherein said wedge means include:
   a pair of wedge members juxtaposed to side portions of at least two of said hooks; and
   spring members connected between the wedge members of each pair, said spring members cooperating with said hooks to urge said wedge members into lug engaging positions as said hooks are pivoted to engage the inverted U-shaped lugs.

7. The store carrier defined in claim 5 wherein said wedge means include a pair of wedge members juxtaposed the side portions of at least two of said hooks, and said hooks include means for loose engagement with said wedge members to restrain said wedge members to a predetermined range of movement.